United States Patent [19]

Dichtel

[11] Patent Number: 4,860,402

[45] Date of Patent: Aug. 29, 1989

[54] CARPET MAT RETAINER CLIP

[76] Inventor: Ronald J. Dichtel, 618 Brookwood La. East, Rochester Hills, Mich. 48309

[21] Appl. No.: 204,572

[22] Filed: Jun. 9, 1988

[51] Int. Cl.⁴ .................... A47G 27/04

[52] U.S. Cl. .................... 16/4; 72/335; 72/379; 16/6; 16/8; 24/354; 24/355

[58] Field of Search .................... 16/4, 8, 6; 296/1 F; 24/150 B, 152, 161, 350, 354, 355; 404/34, 35; 72/335, 336, 337, 379

[56] References Cited

U.S. PATENT DOCUMENTS

| | | | |
|---|---|---|---|
| 19,164 | 1/1858 | Wakefield | 16/4 |
| 91,573 | 1/1869 | Smith | 16/4 |
| 508,735 | 11/1893 | Miller | 24/354 |
| 580,975 | 4/1897 | Hanson | 16/4 |
| 661,220 | 11/1900 | LeFevre | 16/4 |
| 913,159 | 2/1909 | Petrie | 16/4 |
| 1,236,946 | 8/1917 | Kress, Jr. | 24/355 |
| 1,422,658 | 7/1922 | Brooks | 24/354 |
| 3,559,231 | 2/1971 | Hill | 16/4 |
| 4,033,011 | 7/1977 | Endo et al. | 16/4 |

*Primary Examiner*—Nicholas P. Godici
*Assistant Examiner*—Edward A. Brown
*Attorney, Agent, or Firm*—Remy J. VanOphem

[57] ABSTRACT

A retainer clip to fixedly position a mat relative to an underlying carpet particularly suited to automotive environments. The retainer clip is formed from a single piece of generally rectangularly shaped resilient material which has a cut-out cut in a first portion thereof, the cut-out including a series of V-cuts at one end and a control member at the other end. The retainer clip further has two pointed members cut along each edge of a second portion thereof. The retainer clip is then stamped so that the end thereof adjacent the V-cuts is bent thereby causing the V-cuts to erupt as teeth, and the two pointed members are bent so as to be laterally displaced, thereby forming two prongs. The retainer clip is then bent on itself to form a U-shape. In operation, the two prongs are caused to enter the carpet backing in order to anchor the retainer clip thereto. An edge of the floormat is then inserted into an opening in the U-shaped configuration of the retainer clip, the teeth bearing against the floormat to hold it in place relative to the carpet.

18 Claims, 1 Drawing Sheet

CARPET MAT RETAINER CLIP

BACKGROUND OF THE INVENTION

1. FIELD OF THE INVENTION

The present invention relates to clips for holding rugs and mats stationary relative to an underlying carpet and, more particularly, to a single piece stamped clip for the aforesaid purpose.

2. DESCRIPTION OF THE PRIOR ART

It is a well known problem in the art that rugs and mats used to cover carpeting tend to slip along the carpet in the course of use. This problem is particularly vexing in that the whole purpose of using a mat to protect an underlying carpet is defeated by this slippage. Not only is the carpet thereby subject to unpredictable periods of exposure to wear, and to soilage, but the user must expend otherwise unnecessary effort to frequently realign the mat over and over again.

The aforesaid problem is of particular concern in automotive applications where the carpet is subject to extreme levels of wear due to tracking of dirt, salt ladden snow, and a multitude of other undesirable debris that linger on the carpet causing it to prematurely fail. Further, the shoes of the occupants, especially the driver, tend to be repeatedly placed in the same locations on the carpeting causing excessive wear of the carpeting at specific locations. Accordingly, in automotive environments floormats are used which are most commonly made of thick rubber that may or may not have a carpeted upper surface, usually being placed over the car carpeting in the area were the occupant's shoes would normally rest.

A number of solutions have been proposed in the prior art to solve the problem of mat or rug slippage along a surface. These solutions can generally be divided among devices which hold the rug, mat, or carpet relative to an underlying floor and those which hold a rug or mat relative to an underlying carpet.

Devices which secure a rug or carpet to a floor generally include some form of toothed portion that is used to clip or clamp onto the rug or carpet, as well as provision for securing the device to the floor. An example of such device is U.S. Pat. No. 91,573 to Smith dated June 22, 1869, which discloses a curved clip that includes a pointed stud for clamping to carpet. The clip further includes a flat portion that is provided with a nail hole for securing the clip to a floor. With particular regard to automotive applications, U.S. Pat. No. 4,033,011 to Endo et al dated July 5, 1977, discloses a car carpeting clip system including a plurality of lugs located on the metal car body and a similar plurality of hooked members attached to the backing of the carpeting. The carpeting is installed in the vehicle by placing the hooked members on the appropriate lugs.

Devices which secure a rug or mat onto a carpet generally include some form of hooking arrangement which intrudes into the carpet in order to affix the location of the mat relative to the carpet. One common solution in this regard is to use a plurality of nibs across the underside of the mat so that they protrude into the carpeting. An example of such a structure is disclosed in U.S. Pat. No. 3,559,231 to Hill dated Feb. 2, 1971. This proposed solution, however, suffers from inability to hold the mat permanently in position, since the nibs may creep along the uppermost surface of the carpeting, a condition which frequently results in carpet damage.

A more effective system for holding the mat in relation to the carpet is to use a plurality of clips located at strategic points around the periphery of the mat. The following is a brief description of several examples of such devices. U.S. Pat. No 580,975 to Hanson dated Apr. 20, 1897, discloses a rug clamp having joined upper and lower members. The upper and lower members have serrated ends for holding a received rug edge. The upper member is separated from the lower member by action of a spring lever. The rug clamp is secured to the carpet by action of opposing teeth on the other side of the clamp which intrude deeply into the carpeting. U.S. Pat. No. 661,220 to Le Fevre dated Nov. 6, 1900, discloses a rug fastener composed of a flat, metallic base having a first set of pointed prongs located on one side thereof that point in a first direction parallel with the base, and a second set of pointed prongs on the other side of the base pointing in the opposite direction to that of the first set. U.S. Pat. No. 913,159 to Petrie et al date Feb. 23, 1909, discloses a clamp having toothed ends for receiving a mat edge, a sliding collar to clamp the toothed ends, and a pair of sharpened ends for penetrating into the carpeting. The Hanson and Petrie devices are considerably elongated and are consequently not adaptable to solve the hereinabove described automotive floormat slippage problem primarily because there is limited room on the car carpeting beyond the edges of the floormat for the devices to be placed. Further, the seat, heater ducts, and other structures provide too little maneuvering room for securing either of the devices to the carpeting and further since thick, rubber-backed floormats are used, they cannot be held by carpet hooks, as taught by Le Fevre.

Hence, there remains a problem in the art to devise a system for holding the aforesaid mats or rugs, particularly thick, rubberized automotive floormats, in a precisely defined location on carpeting where there is limited available room peripheral to the rug or mat.

SUMMARY OF THE INVENTION

The present invention is a retainer clip for affixing the position of floormats relative to an underlying carpet that is particularly well suited for use in an automotive environment.

The retainer clip according to the present invention is formed from a single piece metal blank, preferably being composed of a spring steel, which has been suitably coated to resist corrosion and present a pleasing finish. A first portion of the retainer clip is provided with a central cut-out. The central cut-out terminates at one end in a series of V-shaped cuts and includes at the other end a substantially rectangular portion which protrudes into the central cut-out. A second portion of the retainer clip has two prongs that are die cut along each side of a base portion of the metal blank. The retainer clip is formed thereafter by stamping the end of the metal blank having the V-shaped cuts upwardly to cause the V-shaped cuts to protrude as a series of teeth, stamping the two prongs so that they are displaced in relation to the base portion of the metal blank, and folding the metal blank into a U-shape so that the teeth protrude into the formed U-shape at the opening thereof. The two prongs are external to the U-shape and face in a direction toward the aforesaid opening and the substantially rectangular portion is oriented substantially perpendicular to the base portion.

In operation, the two prongs are inserted into the backing of the carpeting, thereby causing the retainer clip to be anchored to the carpeting. An edge of the floormat is then inserted into the opening of the U-shape of the retainer clip so that the teeth grip the floormat, causing the floormat to be retained in relation to the carpeting.

Accordingly, it is an object of the present invention to provide a retainer clip for floormats and rugs which is able to be anchored to an automotive carpet.

It is a further object of the present invention to provide a retainer clip for floormats and rugs which is able to easily grip the aforesaid floormat or rug in a manner which releasably affixes the floormat or rug to the retainer clip.

It is yet a further object of the present invention to provide a retainer clip for floormats or rugs which is formed from a single piece metal blank involving only simple die cutting, stamping, and bending operations.

It is still a further object of the present invention to provide a retainer clip for floormats which is particularly well suited for use in cramped automotive environments.

These and other objects, advantages, features, and benefits of the present invention will become apparent from a reading of the following specification.

DETAILED DESCRIPTION OF THE PREFERRED EMBODIMENT

Figure 1:
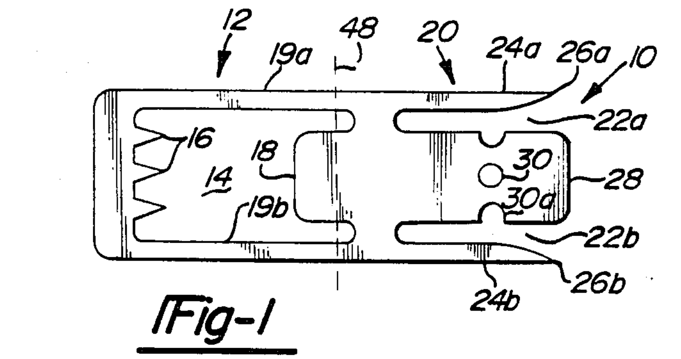
FIG. 1 is a plan view of the metal blank according to the present invention after die cutting.

Referring now to the figures, FIG. 1 shows a main body 10 which is preferred to be initially in the form of a metal blank used to form the retainer clip according to the present invention. As can be seen from FIG. 1, the main body is initially of generally rectangular shape.

As can further be seen from FIG. 1, a first portion 12 of the main body 10 has a central cut-out 14. The central cut-out terminates at a first end in a series of V-shaped cuts 16 and at a second end there is located a control member 18 which protrudes into the central cut-out, the purpose of which will be made clear hereinbelow. The central cut-out is also defined by edge members 19A and 19B which each integrally connect with the aforesaid first and second ends to enclose the central cut-out. A second portion 20 of the main body 10 includes a cut 22A and 22B located on either side thereof. The cuts 22A and 22B each form a pointed member 24A and 24B, respectively. Each pointed member terminates in a pointed tip 26A and 26B, respectively. Between the cuts 22A and 22B is a base portion 28 of the main body 10. The base portion is preferred to have at least one relief cut 30, the purpose of which will become clear hereinbelow. With these cuts made to the metal blank 10, the metal blank is now ready for stamping and bending operations.

Figure 2:
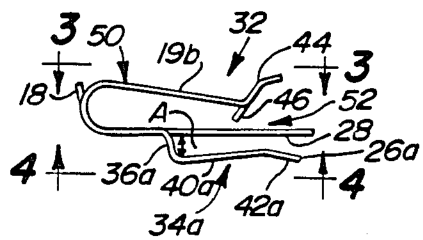
FIG. 2 is a side view of the retainer clip according to the present invention formed from the metal blank of FIG. 1 after stamping and bending operations have been performed.

FIG. 2 shows the results of stamping and bending operations which, in conjunction with the aforesaid cutting operation, results in formation of a retainer clip 32 according to the present invention.

Figure 3:
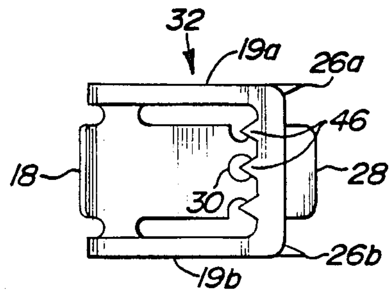
FIG. 3 is plan view of the retainer clip of FIG. 2 taken along line 3—3 thereof.
Figure 4:
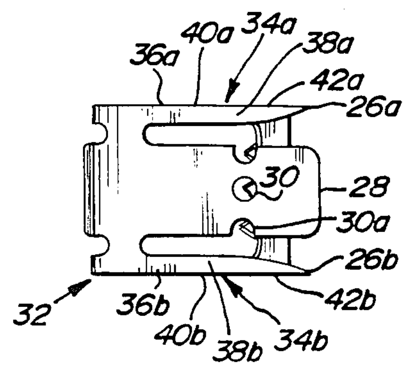
FIG. 4 is a bottom view of the retainer clip of FIG. 2 taken along line 4—4 thereof.

It will be seen from FIG. 2 through 4 that the two pointed members 24A and 24B have been stamped so that they are placed a distance A (FIG. 2) from the base portion 28 of the retainer clip to form two prongs 34A and 34B. The two prongs have attachment portions 36A and 36B, respectively, integral with the base portion 28. The remainder of each prong forms an anchorage portion 38A and 38B (FIG. 4), respectively. The anchorage portion of the prongs are oriented substantially parallel with the adjacent base portion 28 and have pointed ends 26A and 26B, respectively. The anchorage portions 38A and 38B of the prongs are separated from the main body a distance A (FIG. 2) which preferably allows the prongs to rest under the backing of a carpet, while an adjacent base portion 28 rests on the carpet fibers; thus, the length A is defined substantially by the thickness of the carpet. Further, it will additionally be seen from the figures that it is preferred to curve a first section 40A and 40B of the prongs, respectively, toward the base portion 28, then to bend the prongs to form outboard sections 42A and 42B, respectively, which bend away from the base portion. These curves aid installation of the retainer clip 32, as will be described hereinbelow.

Further reference to the figures reveals that the end portion 44 of the first portion 12 is caused to be bent so as to result in the V-shaped cuts 16 erupting as teeth 46. It is preferred to put a curved bow near the edge of the end portion 44 as an aid to mat insertion and removal, as will be explained hereinbelow.

The retainer clip 32 is finally formed by a bending movement of the main body 10 generally about a bending line 48 so as to form a U-shaped configuration 50.

It will be seen further from FIGS. 2 through 4 that the stamping and bending operations have now resulted in the two prongs 34A and 34B being placed just away from the interior of the U-shaped configuration of the base portion 28, while the teeth 46 are now directed into the interior of the U-shaped configuration at an opening 52 therein. Further, the control member 18 has been bent so as to now be oriented substantially perpendicular with respect to the base portion 28. The control member serves as a pushing surface when anchoring the retainer clip 32 in a manner that will be described hereinbelow.

The purpose of the relief cuts 30 will now be made clear. The relief cuts are sized and located such as to allow some of the teeth 46 to protrude thereinto when the U-shaped configuration is in a relaxed, unspread state. The base portion 28 further has a cross-section which is sized in conjunction with the teeth spacing so that the remainder of the teeth 46 will not contact the base portion 28 when the U-shaped configuration is in the aforesaid relaxed state. It is preferred to include 25 one or more relief cuts 30A in order to prevent interfering contact between the teeth and the edge of the base portion when the U-shaped configuration is in a relaxed state. Because of this structure, the U-shaped configuration can be in the aforesaid relaxed state without the teeth themselves causing, by contact with the base portion, any spreading of the U-shaped configuration. This structure is of particular usefulness when very thin mats are inserted into the opening 52 since they will still be gripped by the teeth 46.

A preferred material for the retainer clip 32 is a resilient metal, such as spring steel, which has been coated so as to inhibit corrosion and present a pleasing color and surface texture. In this regard, such materials will ensure that the prongs 34A and 34B will not become bent or deformed in normal use and that the opening 52 will be resiliently biased toward being closed when the U-shaped configuration is in the aforesaid relaxed state. Further, it should be noted that the retainer clip 32 can be made of other types of resilient materials, such as a resilient plastic, in which case the main body 10 is of such material. In the event a resilient plastic is utilized, the retainer clip may then be formed by an injection molding process well known in the art.

Figure 5:
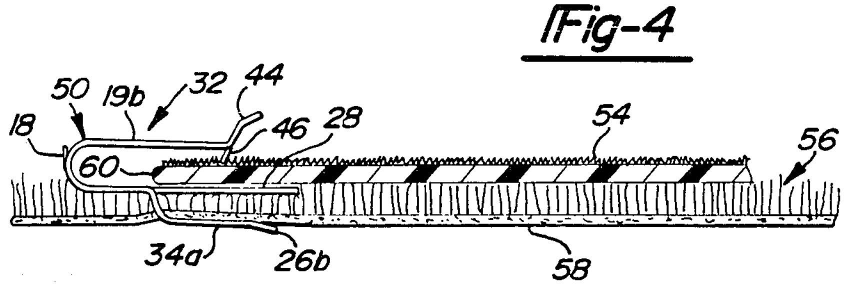
FIG. 5 is a side view of the retainer clip according to the present invention in operation.

Operation of the retainer clip 32 according to the present invention will now be described with particular reference to FIG. 5.

The user first determines the preferred location of a mat 54 on an underlying carpeting 56. Then the retainer clip 32 is oriented with the prongs 34A and 34B adjacent to and parallel with the carpeting so that the prongs may be inserted into the carpet. The user then grips the retainer clip 32 with the thumb and forefinger opposed on either side of the control member 18. The retainer clip is now thrust into the carpeting so that the prongs penetrate the backing 58 of the carpeting. The prongs will then come to rest with the attachment portions 36A and 36B adjacent the backing and the anchorage portions of the prongs will be oriented parallel with the backing 58. During this step, the user should be careful to ensure that the retainer clip 32 ends up at a location on the carpeting in such a manner that an edge of the mat will be located within the U-shaped portion of the retainer clip when the mat is placed in the aforesaid predetermined location. This step is further repeated for a desired number of retainer clips about the periphery of the soon to be in place mat. Next, the mat is positioned generally in the aforesaid predetermined location and edges 60 thereof are successively inserted into the opening 52 of each retainer clip 32 by pressing upwardly on the end portion 44 and then releasing so that the mat is gripped by the teeth 46. It is preferred in this regard that the teeth be angled toward the U-shaped configuration in order to maximize resistance to the mat being pulled from the grip of the teeth. In this manner the mat is held securely in place, with anchorage for the retainer clip being provided by action of the prongs 34A and 34B with the carpet backing. To remove the mat, the user need only press upwardly on the end portion 44 so as to cause the teeth to disengage the mat, then remove the mat from the U-shaped configuration 50.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. A clip for retaining a mat in stationary relationship with respect to an underlying carpet, said clip comprising:

a main body having a substantially U-shaped configuration, said substantially U-shaped configuration defining a first portion, a second portion spaced from said first portion and a closed end curved portion defining means for biasing said first portion towards said second portion, said first and second portion defining a converging opening therebetween when said said main body is in a relaxed state for releasably receiving said mat;

at least one tooth located at one end of said main body, said at least one tooth protruding into said opening of said substantially U-shaped configuration of said main body so as to grip said mat when said mat is inserted into said opening; and a pair of prongs connected with said main body, each prong of said pair of prongs being in substantially mutual parallel alignment, each said prong having an anchorage portion which is oriented in a substantially parallel relationship with an adjacent portion of said main body, each said prong having a substantially pointed end facing in a direction away from said opening, said pair of prongs providing selective anchorage of said clip with respect to said underlying carpeting, said closed end curved portion further comprising a control member portion whereby a user may apply a force against said control member portion to anchor said pair of prongs into said underlying carpet

2. The clip of claim 1, wherein said clip is formed from a single piece of material.

3. The clip of claim 2, wherein said material is a resilient metal.

4. The clip of claim 2, wherein said material is a resilient plastic.

5. The clip of claim 1, wherein said anchorage portion of each said prong is displaced from said main body a predetermined distance.

6. The clip of claim 5, wherein said underlying carpet has a backing layer with carpet fibers attached thereto; further wherein said predetermined distance is a length such that said anchorage portion of each said prong may penetrate said backing layer and rest adjacent said backing layer and said main body will rest on said carpet fibers of said underlying carpet.

7. The clip of claim 5, wherein said at least one tooth is comprised of a plurality of teeth aligned adjacent said opening.

8. The clip of claim 7, wherein said main body includes at least one relief cut for permitting a portion of said plurality of teeth to protrude therethrough.

9. The clip of claim 5, wherein said control member portion includes a substantial planar segment to which a user may apply a force when said pair of prongs are being anchored in said backing layer.

10. A clip for retaining a mat in stationary relationship with respect to an underlying carpet, said underlying carpet having a backing layer with carpet fibers attached thereto, said clip comprising:

a single piece main body having a substantially U-shaped configuration, said substantially U-shaped configuration having a converging opening for receiving said mat, said main body being made of a resilient material and further having a means for biasing said converging opening towards a substantially closed position when said U-shaped configuration is in a relaxed state;

at least one tooth integrally connected to one end of said main body, said at least one tooth protruding into said converging opening of said substantially U-shaped configuration of said main body for communicating with said mat when said mat is inserted into said opening; and a pair of prongs integrally connected with said main body, each prong of said pair of prongs being in substantially mutual parallel alignment, each said prong having an anchorage portion which is oriented in a substantially parallel relationship with an adjacent portion of said main body, each said prong having a substantially pointed end facing in a direction away from said opening, said pair of prongs providing selective anchorage of said clip with respect to said underlying carpeting, said anchorage portion of each said prong being displaced from said main body a distance such that said anchorage portion of each said prong may penetrate said backing layer and rest adjacent said backing layer and said main body will rest on said carpet fibers of said underlying carpet.

11. The clip of claim 10, wherein said material is a resilient metal.

12. The clip of claim 10, wherein said material is a resilient plastic.

13. The clip of claim 10, wherein said at least one tooth is comprised of a plurality of teeth aligned adjacent said opening.

14. The clip of claim 13, wherein said main body includes at least one relief cut for permitting a portion of said plurality of teeth to protrude therethrough.

15. The clip of claim 10, wherein said main body integrally includes an upstanding control member located remote from said opening to which a user may apply a force when said pair of prongs are being anchored in said backing layer of said underlying carpet.

16. A method for forming a clip for retaining a mat in stationary relationship with respect to an underlying carpet, said method comprising the steps of:

providing a main body having a substantially rectangular shape, said main body being composed of a blank of resilient material;

die cutting a first portion of said main body to provide a central cut-out, said central cut-out having at least one V-shaped cut near one end thereof and a control member projecting thereinto at the other end thereof and further die cutting a second portion of said main body to provide a pair of cuts, each cut being located near an opposite side of said main body, each said cut forming a pointed member, the portion of said main body between each said pointed member forming a base portion;

stamping said blank to form at lest one tooth by bending said one end of said blank to cause said at least one V-cut to erupt as at least one tooth and further stamping said blank to form a pair of prongs by bending a portion of each said pointed member away from said main body so that a portion of each said prong is displaced from said base portion in parallel relation thereto; and bending said main body into a U-shaped configuration having an opening such that said at least one tooth projects into said opening, said pair of prongs remain substantially parallel with said base portion and outside said U-shaped configuration, and said control member is upstanding in relation to said base portion.

17. The method of claim 16, wherein said step of die cutting includes cutting at least one relief cut in said blank.

18. The clip formed by the method of claim 16.

* * * * *

UNITED STATES PATENT AND TRADEMARK OFFICE
CERTIFICATE OF CORRECTION

PATENT NO. : 4,860,402

DATED : August 29, 1989

INVENTOR(S) : Ronald J. Dichtel

It is certified that error appears in the above-identified patent and that said Letters Patent is hereby corrected as shown below:

Column 2, line 19, delete "date" and insert --dated--.

Column 4, line 55, delete "25".

Column 6, line 19, after "carpet" insert --.--.

Column 8, line 14, delete "lest" and insert --least--.

Column 8, line 26, before "outside" insert --are located --.

Signed and Sealed this

Ninth Day of October, 1990

*Attest:*

HARRY F. MANBECK, JR.

*Attesting Officer*

*Commissioner of Patents and Trademarks*